Aug. 16, 1966 J. S. CHOMICKI ETAL 3,267,459

DATA TRANSMISSION SYSTEM

Filed Dec. 18, 1962 2 Sheets-Sheet 1

INVENTORS
JOHN S. CHOMICKI
DALE L. CRITCHLOW
BY Francis J. Thomas
ATTORNEY

THRESHOLD CIRCUIT 3,267,459

DATA TRANSMISSION SYSTEM

John S. Chomicki, East Fishkill, and Dale L. Critchlow, Lincolndale, N.Y., assignors to International Business Machines Corporation, New York, N.Y., a corporation of New York Filed Dec. 18, 1962, Ser. No. 245,550
14 Claims. (Cl. 340—347)

This invention relates to data transmission and in particular to high-speed, multi-level transmission of digital data.

The operation of many data systems is enhanced by the facility to communicate data between two or more locations. For example, in connection with digital computation, it is often advantageous to use a central computer with several remote input-output devices.

One technique for transmitting binary digital data between locations makes use of the conventional communication channels such as telephone or microwave channels. In this case, the binary data is serially transmitted directly or as the modulation signal on a carrier signal. The transmission speed is limited by several factors including the frequency characteristics of the transmission channel. This technique may be extended to increase the speed of transmission by using more than one channel or by simultaneously transmitting more than one data element at a time on the same channel. The latter case makes more efficient use of the transmission facilities and may be implemented by transmitting multi-level (more than two-level) data. For example, four-level data contains two elements of binary data, eight-level data contains three elements of binary data and, in general $2^n$ level data contains $n$ binary data elements. The number of levels need not be an integral power of 2. For example, three-level data transmission may be employed, where each pair of three-level data elements corresponds to three binary data elements. Thus, a multi-level transmission system can effectively increase the speed of data transmission by simultaneously transmitting several elements of binary data.

A primary problem encountered in all data transmission involves the restoration of the signal after transmission. When a D.C. reference level is not transmitted, the problem requires that this D.C. level be restored. Since a transmission system should not place a limitation on the data to be transmitted, it must be capable of transmitting any pattern of data elements. When the transmitted data happens to change value frequently throughout its range of values, D.C. restoration may be simply accomplished with a conventional clamp circuit in a manner similar to that commonly used in television receivers. However, when the transmitted data assumes the same value for a considerable period of time, the conventional clamp circuits tend to drift and transmission errors occur. This problem is serious in two-level data transmission and is even more pronounced in higher-level transmission.

A solution to the D.C. restoration problem for two-level transmission is described in a paper by F. K. Becker, J. R. Davey and B. R. Saltzberg, entitled An AM Vestigial Sideband Data Tranmission Set Using Synchronous Detection for Serial Transmission up to 3000 Bits per Second which was presented at the Fall General Meeting of the A.I.E.E. in Detroit, Michigan in October 1961. This solution makes use of a two-state limiter circuit whose output maintains the D.C. reference level even though the transmitted binary data does not change in value over long periods of time. Although this solution presumably provides good results, at least in the low-frequency environment in which it is described, the solution is limited to two-level (binary) transmission systems which are relatively inefficient when compared to multi-level transmission systems.

Accordingly, it is an object of the present invention to show D.C. restoration techniques which permit the use of multi-level data transmission.

A further object of this invention is to show digital D.C. restoration techniques which permit the use of multi-level data transmission.

Another object is to show D.C. restoration techniques that permit the use of four-level data transmission.

A further object is to show D.C. restoration techniques in conjunction with a four-level data transmission system for the simultaneous transmission of two binary data elements.

A still further object is to show D.C. restoration techniques in conjunction with a four-level data transmission system for the simultaneous transmission of two binary data elements A and B, where the four-level data is encoded according to $2A+B$.

A still further object is to show D.C. restoration techniques in conjunction with a $2^n$-level data transmission system for the simultaneous transmission of $n$ binary data elements A, B, . . ., N, where the $2^n$-level data is encoded according to $(2^{n-1})A+(2^{n-2})B+ \ldots +N$.

Another object is to show a multi-state device which may be used as the decoder in a multi-level transmission system.

The foregoing and other objects, features and advantages of the invention will be apparent from the following more particular description of a preferred embodiment of the invention, as illustrated in the accompanying drawings.

In the drawings:

FIGURE 3 is a detailed diagram of a threshold circuit which is suitable for use in the embodiment in FIGURE 1.

Figure 1:
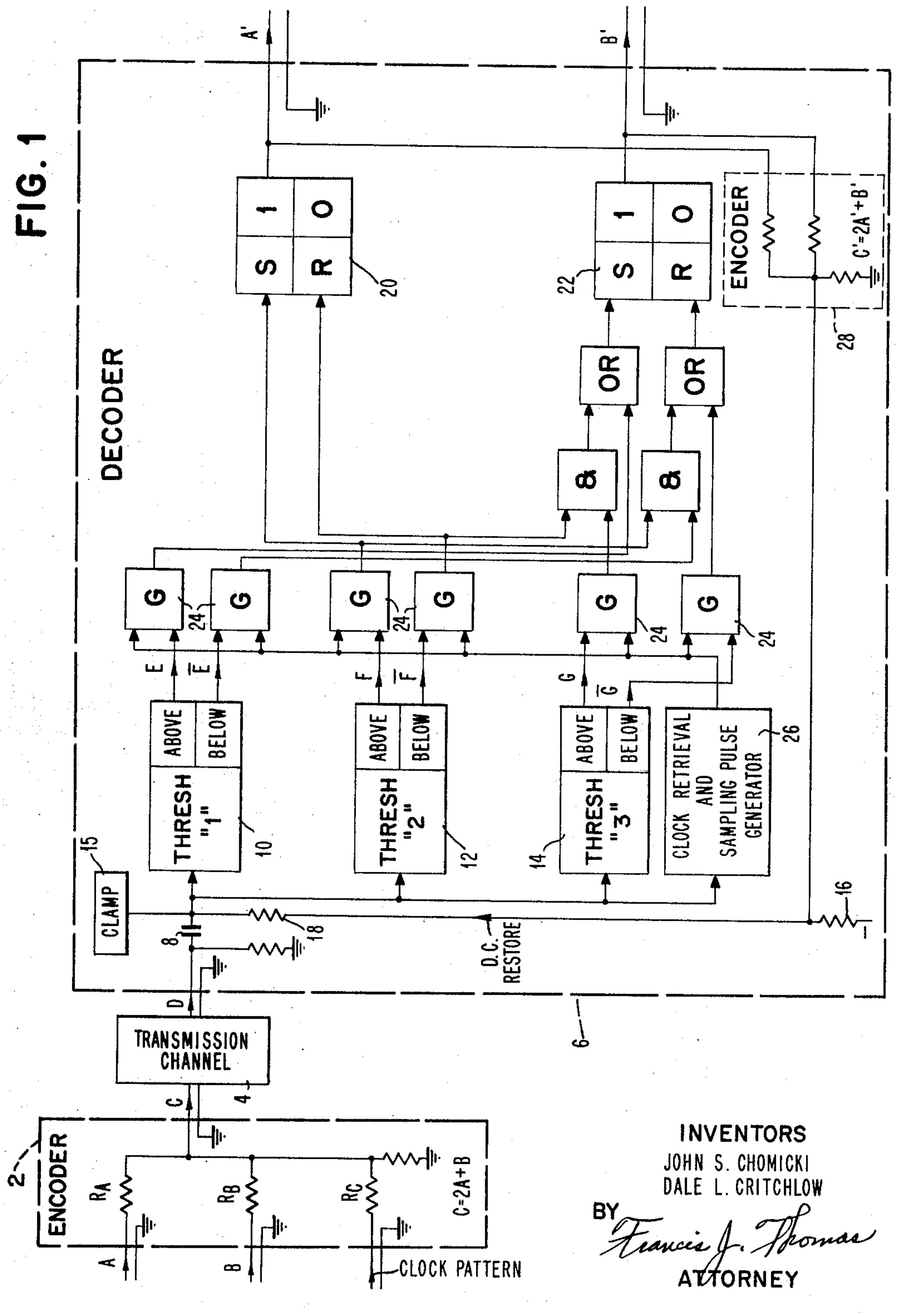
FIGURE 1 is a diagram showing the preferred embodiment of the invention.

The invention is embodied in FIGURE 1 in a four-level data transmission system which is capable of simultaneously transmitting two trains of binary data elements. Two typical pulse trains are shown as waveshape A and B in FIGURE 2 where, for the purpose of explanation, binary data with a value "1" provides a signal in the positive (up) direction and binary data with a value "0" provides a signal in the negative (down) direction. The pulse train A represents the sequence of binary elements: 1 0 1 0 0 0 1 0 1 1 1 0 1 0 and the pulse train B represents: 0 1 1 0 1 0 0 0 1 0 1 1 1 0. This input data A and B is applied to an encoder (FIGURE 1) which generates waveform C (FIGURE 2) as the sum: $2A+B$. The encoder accomplishes this summation with a resistor summing network where $R_B$ has double the resistance of $R_A$. In addition to the input data of A and B a low level clock pattern is superimposed on the encoder output. This pattern is applied through a resistance $R_C$ which has a resistance that is about ten times the resistance of $R_B$. The pattern has the shape of a square wave with a frequency that is half the repetition rate of the data pulse trains. This low level clock pattern is used in the decoder in conjunction with the timing circuits in a manner to be described below. The effect of the clock pattern is not shown in waveshape C (FIGURE 2) for simplicity and because its amplitude is slight in comparison to the data components of the waveshape.

Figure 2:
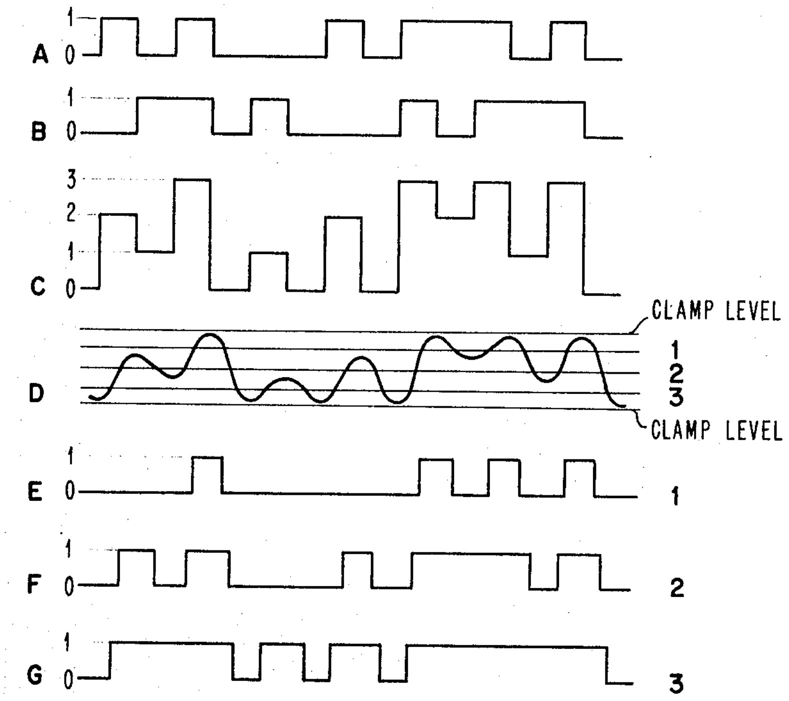
FIGURE 2 is a group of waveshape diagrams which are labelled to correspond to certain points in FIGURE 1.
Figure 2:
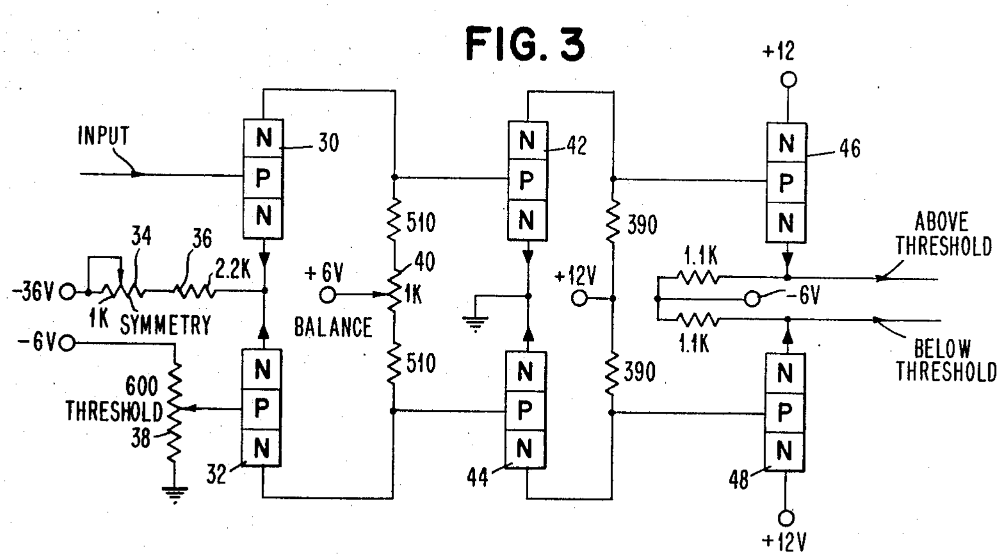

The encoded four-level signal C is applied to a band-pass channel 4 which is of the synchronous type that does not produce any appreciable phase or frequency shift. This channel may be merely a pair of wires or it may comprise a microwave channel with many relay stations, or any other type of communications channel that provides synchronous transmission. The output of the transmission channel is shown in FIGURE 2 as waveshape D, which is a somewhat distorted and delayed reproduction of waveshape C.

A decoder 6 (FIGURE 1) accepts the encoded signal (waveshape D) from the transmission channel and derives the constituent signals A′ and B′ which correspond to input waveshapes A and B (FIGURE 2) but are delayed.

The input to the decoder 6 is applied through a capacitor 8 to the input of three threshold circuits 10, 12 and 14. The threshold circuits (which will be described in detail with respect to FIGURE 3) provide two outputs: an "above" output when the applied signal exceeds the predetermined threshold and a "below" signal when the applied signal does not exceed this threshold. The three horizontal lines that intersect waveshape D in FIGURE 2 show the threshold voltages for the corresponding threshold circuits 10, 12 and 14. For example, the horizontal line labelled "1" corresponds to threshold circuit "1." Waveshape D is superimposed upon a negative D.C. voltage level that is applied through resistors 16 and 18. Thus waveshape D represents a varying negative voltage rather than a bipolar voltage. This permits the use of identical threshold circuits (with different threshold values) for threshold circuits "1," "2" and "3."

Waveshape D is also controlled by a clamp circuit 15 which comprises two conventional diode clamps. One diode clamp insures that waveshape D does not exceed a level that is slightly higher than the uppermost excursion of the waveshape and the other maintains the waveshape above a level that is slightly below the lowermost excursion of the waveshape as shown in FIGURE 2. The clamping action takes place during an automatic set-up procedure which precedes data transmission. During this procedure, a sequence of set-up signals is transmitted where the set-up signals alternate between the extremes of the four levels ($A=1$, $B=1$ followed by $A=0$, $B=0$, followed by $A=1$, $B=1$, etc.). The clamp circuit places this sequence of signals in approximately the proper range with respect to the operating thresholds of circuits 10, 12 and 14. After several set-up signals are applied to the encoder, the automatic D.C. restoration system (to be described in detail below) operates to precisely regulate the signal level of waveshape D and the clamp circuit 15 has no further function.

Waveshapes E, F and G in FIGURE 2 indicate the "above" outputs of the threshold circuits. The "below" outputs ($\overline{E}$, $\overline{F}$ and $\overline{G}$) are not shown in FIGURE 2 but are merely the inverted images of waveshapes E, F and G. The output of the threshold circuits are applied to logic circuitry to control the operation of two bistable devices 20 and 22 (e.g. flip-flops) which generate the system output signals A′ and B′. Each bistable device produces a "1" signal at its "1" output when a signal is applied to its "S" (set) input, and provides a "0" signal at this output when a signal is applied to its "R" (reset) input. The logic circuitry connecting the threshold circuits to the bistable devices are controlled by signals E, $\overline{E}$, F, $\overline{F}$, G and $\overline{G}$ and generate output signals A′ and B′ according to:

$$A'=F$$
$$\overline{A}'=\overline{F}$$
$$B'=E+\overline{F}G$$
$$\overline{B}'=\overline{E}F+\overline{G}$$

The following table illustrates the values of A′ and B′ for the various combinations of outputs from the threshold circuits.

| Threshold "1" | Threshold "2" | Threshold "3" | A′ | B′ |
|---|---|---|---|---|
| 1 | 1 | 1 | 1 | 1 |
| 0 | 1 | 1 | 1 | 0 |
| 0 | 0 | 1 | 0 | 1 |
| 0 | 0 | 0 | 0 | 0 |

The four possible conditions illustrated by the above table are the only four that can exist because threshold "1" cannot be exceeded without exceeding thresholds "2" and "3" and threshold "2" cannot be exceeded without exceeding threshold "3."

The outputs of the threshold circuits 10, 12 and 14 are periodically sampled by transmission gates 24 as signals are applied from a clock retrieval and sampling pulse generator circuit 26. This circuit is synchronized by the clock pattern which is superimposed on waveshape D in the encoder 2. The clock retrieval and sampling pulse generator circuit is shown and described in a commonly-assigned U.S. Patent No. 3,209,261 issued Sept. 28, 1965 to Dale L. Critchlow and entitled Transmission Systems.

The bistable device 20, which corresponds to the A′ output, is set when the input signal exceeds threshold "2" (by the signal F) and is reset (by the signal $\overline{F}$) when waveshape D does not exceed threshold "2." Bistable device 22, which corresponds to the B′ output, is set when either waveshape D exceeds threshold "3" (G) and does not exceed threshold "2" ($\overline{F}$), or when waveshape D exceeds threshold "1" (E). This bistable device 22 is reset when either waveshape D exceeds threshold "2" (F) and does not exceed threshold "1" ($\overline{E}$), or when waveshape D does not exceed threshold "3" ($\overline{G}$). Thus, it can be seen that the logic circuitry connecting the threshold circuits to the bistable devices accomplish the requirements outlined in the above table.

A D.C. restoration circuit is of fundamental importance to the operation of the decoder 6 because it insures that when an unbalanced input signal (a signal containing more data of one value then of another value over a period of time) is applied through capacitor 8, the D.C. reference level does not drift. The conventional clamp circuit 15 is incapable of accurately controlling the D.C. reference level when an unbalanced input is present. Precise D.C. restoration is accomplished in the decoder 6 by the use of an encoder 28 which combines output signals A′ and B′ to generate a feedback signal C′ according to: $C'=2A'+B'$. This encoder is identical in operation to encoder 2 which has been described above. The feedback signal C′ resembles waveshape C (FIGURE 2) but is delayed in time due to the delay in generating signals A′ and B′.

Since the actual binary output signals A′ and B′ are combined to form C′ it is impossible for the D.C. level of the input signal (waveshape D) to drift. The digital feedback signal C′ is controlled by the signals A′ and B′ from the bistable devices 20 and 22 and this feedback signal varies by a discrete amount when, and only when, the signal to the decoder (waveshape D) represents a change in the binary input data A and B. When a change in data occurs, one or more of the threshold circuits changes its output signals to control the bistable devices which, in turn, cause an appropriate discrete change in the feedback signal C′. The values of resistors 16 and 18 control the amount of feedback and their values are selected as a function of the operating levels of the threshold circuits 10, 12 and 14.

FIGURE 3 is a detailed diagram of a threshold circuit that is suitable for use as any of the threshold circuits shown in FIGURE 1. The input to the threshold circuit is applied as one input to a differential amplifier comprising transistors 30 and 32 and a common emitter load resistance including a "symmetry" potentiometer 34 and resistor 36. The second input to the differential amplifier represents the predetermined threshold as established by the setting of a "threshold" potentiometer 38. The collector circuits of transistors 30 and 32 are returned to a source through a "balance" potentiometer 40. The differential amplifier collector output voltages are applied as the inputs to amplifier circuits comprising transistors 42 and 44 and then to emitter follower circuits comprising transistors 46 and 48. The emitter followers provide the "above threshold" and "below threshold" output signals that are referred to in FIGURE 1. When the input signal exceeds the threshold (less negative than the threshold) that is established by the "threshold" potentiometer 38, collector current flows through transistor 30 to provide a negative collector voltage, and transistor 32 is cut off to provide a positive collector voltage. These collector voltages cut off transistor 42 providing a positive voltage to the base of transistor 46, and cause transistor 44 to saturate providing a zero voltage to the base of transistor 48. The emitter followers (transistors 46 and 48) provide output signals corresponding to their base input signals and, in this example, the "above threshold" output lead contains a positive signal and the "below threshold" lead contains a zero signal. When the input signal does not exceed the threshold (more negative than the threshold) opposite effects are produced to generate a positive signal on the "below threshold" lead and a zero signal on the "above threshold" lead.

The "balance" potentiometer is adjusted to provide equal signals on the "below threshold" and "above threshold" output leads when the input signal equals the voltage established by the "threshold" potentiometer 38. The "symmetry" potentiometer 34 is then adjusted to provide a zero voltage on both output leads when this condition exists.

A multi-level data transmission system has been shown and described which employs a decoder with a discrete (digital) D.C. feedback signal to provide D.C. restoration which cannot drift even though the transmitted data comprises values that are not balanced over any given period of time. Although the preferred embodiment shows four-level data transmission, the fundamental concept of providing discrete D.C. restoration that is generated by encoding signals corresponding to the transmitted data is obviously extendable to operate in any multi-level (three or more levels) data transmission systems.

While the invention has been particularly shown and described with reference to a preferred embodiment thereof, it will be understood by those skilled in the art that various changes in form and details may be made therein without departing from the spirit and scope of the invention.

What is claimed is:

1. A transmission system for binary data comprising, in combination:

a first encoder for converting binary data into multi-level data signals transmission means coupled to said encoder including a channel for transmitting said multi-level data signals;

a decoder having an input coupled to said transmission means for converting the multi-level data signals into binary data;

a second encoder coupled to said decoder and responsive to the binary data produced by said decoder for converting said binary data into a multi-level output signal;

and means connected to said decoder and said second encoder for combining the output signal of the second encoder with the input to the decoder.

2. A transmission system for binary data comprising, in combination:

a first encoder for converting binary data into multi-level data signals containing $2^n$ levels, where $n$ is an integer that is greater than one;

means including a transmission channel coupled to said encoder for transmitting said multi-level data signals;

and a decoder coupled to said transmission channel and responsive to said multi-level data signals for converting the multi-level data into binary data including a second encoder that is responsive to this binary data for generating a multi-level D.C. restoration signal.

3. A four-level to binary decoder comprising, in combination:

a source of input signal having an amplitude of one of four possible selected amplitude levels;

three threshold circuits, each responsive to said input signal, and each having a separate threshold level that is in a different one of the three regions between the first and second, second and third, and third and fourth possible amplitude levels of said signal, for producing an output signal representative of the relative level of the four-level input signal with respect to its threshold level;

a logic circuit coupled to the output of said threshold circuits for producing output signals representative of the output signals of said threshold circuits;

two bistable devices coupled to said logic circuit, each for providing a binary output signal representative of said output signals from said logic circuit;

and a binary to four-level encoder responsive to the output signals from said bistable devices for reproducing said four-level input signal as a feedback signal;

and means coupled between said bistable devices and said three threshold circuits for connecting said feedback signal to said threshold circuits.

4. An N-level to binary decoder comprising, in combination:

a source of input signals having an amplitude at one of N possible amplitudes,

N–1 threshold circuits, each responsive to said input signal, each operating having a threshold level that is in a different one of the N–1 regions between two adjacent levels of the applied N-level signal, for producing an output signal representative of the relative level of the N-level signal with respect to its threshold level;

a logic circuit coupled to the output of said threshold circuits for producing output signals representative of the output signals of said threshold circuits;

a plurality of bistable devices coupled to said logic circuit, each for providing a binary output signal indication representative of said output signals from said logic circuit;

and a binary to N-level encoder responsive to the output signals from said bistable devices for reproducing said N-level data input signal as a feedback signal;

and means coupled between said bistable devices and said N–1 threshold circuits for connecting said feedback signal to said threshold circuits.

5. The apparatus described in claim 1, wherein the multi-level data contains four levels.

6. The apparatus described in claim 5, wherein the decoder includes three threshold circuits and a logic circuit connected to said three threshold circuits and responsive to the outputs of the threshold circuits for converting the four-level data into binary data.

7. The apparatus described in claim 2, wherein the decoder includes three threshold circuits and a logic circuit connected to said three threshold circuits and responsive to the outputs of the threshold circuits for converting the $2^n$ level data into binary data.

8. The apparatus described in claim 2, wherein said binary data is manifested by a first binary waveform A and a second binary waveform B and wherein said binary waveforms A and B are encoded according to the waveform combination $2A+B$ in said first and second encoders.

9. The apparatus described in claim 2, wherein said binary data is manifested in N waveforms A, B, . . . , N which are encoded according to the waveform combination $(2^{n-1})A+(2^{n-2})B+ \ldots N^1$.

10. The apparatus described in claim 5, wherein said binary data is manifested by a first binary waveform A and a second binary waveform B and wherein said binary waveforms A and B are encoded according to the waveform combination $2A+B$ in said first and second encoders.

11. The apparatus described in claim 6, wherein said binary data is manifested by a first binary waveform A and a second binary waveform B and wherein said binary waveforms A and B are encoded according to the waveform combination $2A+B$ in said first and second encoders.

12. The apparatus described in claim 7, wherein said binary data is manifested by a first binary waveform A and a second binary waveform B and wherein said binary waveforms A and B are encoded according to the waveform combination $2A+B$ in said first and second encoders.

13. The apparatus described in claim 1, wherein said binary data is manifested in N waveforms A, B, . . . , N which are encoded according to the waveform combination $(2^{n-1})A+(2^{n-2})B+ \ldots N^1$ in said first and second encoders.

14. A four stable state device for generating output signals consisting of two binary data elements having a combined value that is uniquely representative of the four-level input data comprising, in combination:

a source of input signal having an amplitude of one of four possible amplitude levels;

two bistable devices for generating the binary output signals having a combined value that is representative of said input signal;

means coupled to said source of input signal and to said bistable devices responsive to said four-level signal for decoding the four-level signal according to the relationship between said input data and said binary output signals for controlling the bistable devices therewith;

and encoding means coupled to said binary devices and responsive to the binary output signals for encoding these signals into a feedback signal in a form corresponding to the four-level input data according to the unique relationship between the output signals and the input data.

References Cited by the Examiner

UNITED STATES PATENTS

| | | | |
|---|---|---|---|
| 2,912,684 | 11/1959 | Steele | 340—347 |
| 3,051,901 | 8/1962 | Yaeger | 325—38 |
| 3,078,378 | 2/1963 | Burley | 307—88.5 |

MAYNARD R. WILBUR, *Primary Examiner.*

MALCOLM A. MORRISON, *Examiner.*

W. J. ATKINS, *Assistant Examiner.*